(12) United States Patent
Wood et al.

(10) Patent No.: US 8,333,552 B2
(45) Date of Patent: Dec. 18, 2012

(54) COMBINED ACOUSTIC ABSORBER AND HEAT EXCHANGING OUTLET GUIDE VANES

(75) Inventors: Trevor Howard Wood, Clifton Park, NY (US); Todd Garrett Wetzel, Niskayuna, NY (US); Jonathan Glenn Luedke, Simpsonville, SC (US); Thomas Michael Tucker, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 911 days.

(21) Appl. No.: 12/416,950

(22) Filed: Apr. 2, 2009

(65) Prior Publication Data

US 2009/0317238 A1 Dec. 24, 2009

Related U.S. Application Data

(63) Continuation-in-part of application No. 12/342,466, filed on Dec. 23, 2008, which is a continuation-in-part of application No. 12/142,940, filed on Jun. 20, 2008, now abandoned.

(51) Int. Cl.
| | |
|---|---|
| *F03D 11/00* | (2006.01) |
| *F01D 5/14* | (2006.01) |
| *F01D 5/08* | (2006.01) |
| *F01D 9/00* | (2006.01) |
| *F01D 1/02* | (2006.01) |

(52) U.S. Cl. ............ 415/119; 415/115; 415/211.2; 415/178; 415/208.2

(58) Field of Classification Search ............ 415/119, 415/115, 211.2, 200, 178, 191, 177, 173.1, 415/194, 199.5, 193, 208.2, 195, 199.4, 209.1
See application file for complete search history.

(56) References Cited

U.S. PATENT DOCUMENTS

| | | | |
|---|---|---|---|
| 3,116,613 A | 1/1964 | Evelyn et al. | |
| 4,594,761 A * | 6/1986 | Murphy et al. | ............ 29/889.71 |
| 5,782,082 A | 7/1998 | Hogeboom et al. | |
| 7,105,127 B2 | 9/2006 | Vatchiants | |
| 2004/0245383 A1* | 12/2004 | Udall | ............... 244/54 |

FOREIGN PATENT DOCUMENTS

WO 0153023 A1 7/2001

OTHER PUBLICATIONS

Wassim Elias Azzi; "A Systematic Study on the Mechanical and Thermal Properties of Open Cell Metal Foams for Aerospace Applications"; A thesis submitted to the Graduate Faculty of North Carolina State University in partial fulfillment of the requirements for the Degree of Master of Science; 125pages.

(Continued)

*Primary Examiner* — Chuong A. Luu
(74) *Attorney, Agent, or Firm* — Scott J. Asmus

(57) ABSTRACT

An outlet guide vane assembly for turbomachines is provided. The outlet guide vane assembly comprises one or more outlet guide vanes, wherein each of the one or more outlet guide vanes comprises a first surface and a second surface, and wherein the one or more outlet guide vanes are disposed between an inner wall and an outer wall of an engine and a surface cooler layer disposed on at least a portion of the first surface, the second surface, or both of the one or more outlet guide vanes, wherein the surface cooler layer comprises a metal foam, a carbon foam, or a combination thereof, wherein the metal foam, the carbon foam or the combination thereof is configured to augment heat transfer and enhance acoustic absorption.

32 Claims, 7 Drawing Sheets

OTHER PUBLICATIONS

Pontus Nordin, Sohan L. Sarin and Edward R. Rademaker; "Development of New Liner Technology for Application in Hot Stream Areas of Aero-Engines"; 2004 by Saab AB. Published by the American Institute of Aeronautics and Astronautics, Inc., with permission; 13pages.

* cited by examiner

COMBINED ACOUSTIC ABSORBER AND HEAT EXCHANGING OUTLET GUIDE VANES

CROSS REFERENCE TO RELATED APPLICATIONS

This application is a Continuation-in-Part of U.S. patent application Ser. No. 12/342,466, entitled "COMBINED SURFACE COOLER AND ACOUSTIC ABSORBER FOR TURBOMACHINES," filed Dec. 23, 2008, and U.S. patent application Ser. No. 12/142,940, entitled "SYSTEM AND METHOD FOR REDUCTION OF UNSTEADY PRESSURES IN TURBOMACHINERY," filed Jun. 20, 2008 each of which is herein incorporated by reference.

BACKGROUND

The invention relates generally to turbomachines, and more particularly to the design of enhanced outlet guide vanes for use in turbomachines.

As will be appreciated, a conventional gas turbine engine typically includes a fan assembly. Airflow that exits the fan assembly is split such that a portion of airflow passes into a booster compressor while the remaining portion of the airflow is bypassed. This bypass air flows past and interacts with a stage of the outlet guide vanes (OGVs). These OGVs are generally disposed between annular inner and outer walls, where the inner and outer walls are mounted in an OGV support structure mechanically tied into an engine casing. Outlet guide vanes typically have airfoil like cross-sections that include a leading edge, a relatively thick middle section, and a thin trailing edge. Accordingly, it may be desirable to dissipate heat from the engine through the OGVs. In addition, as will be appreciated, the levels of noise emanating from the OGVs are typically high. Hence, it may also be desirable to reduce noise levels resulting from the OGVs.

Aircraft gas turbine engine manufacturers are developing new ways of effectively reducing noise. Currently, nacelles on jet engines utilize liners or acoustic panels to absorb sound produced by the blades and vanes or other turbomachinery elements in the turbofan. These panels are typically located on the nacelle walls. Additionally, it is desirable to place heat sinks in similar locations for removing heat from oil, water, and other coolants. Unfortunately, these heat sinks occupy space that may otherwise be used to house acoustic panels or other materials for further acoustic absorption.

Furthermore, certain currently available techniques typically use separate heat exchangers and acoustic absorbers to address the cooling and noise reduction needs of the turbomachines. Additionally, various techniques such as running the coolant tubes in the outlet guide vanes (OGV) to facilitate heat transfer have been developed. Unfortunately, the smooth wall of an OGV is not an efficient heat transfer surface.

It may be therefore desirable to develop an OGV that may be used for acoustic absorption as well as for heat exchange.

BRIEF DESCRIPTION

Briefly in accordance with one aspect of the present technique an outlet guide vane assembly is provided. The outlet guide vane assembly comprises one or more outlet guide vanes, wherein each of the one or more outlet guide vanes comprises a first surface and a second surface, and wherein the one or more outlet guide vanes are disposed between an inner wall and an outer wall of an engine and a surface cooler layer disposed on at least a portion of the first surface, the second surface, or both of the one or more outlet guide vanes, wherein the surface cooler layer comprises a metal foam, a carbon foam, or a combination thereof, wherein the metal foam, the carbon foam or the combination thereof is configured to augment heat transfer and enhance acoustic absorption.

In accordance with another aspect of the present technique an outlet guide vane assembly is provided. The outlet guide vane assembly comprises one or more outlet guide vanes, wherein each of the one or more outlet guide vanes comprises a first surface and a second surface, and wherein the one or more outlet guide vanes are disposed between an inner wall and an outer wall of an engine. The outlet guide vane assembly further comprises a surface cooler layer disposed between a second surface of a first outlet guide vane and a first surface of a second outlet guide vane, and wherein the surface cooler layer comprises a metal foam, a carbon foam, or a combination thereof, wherein the metal foam, the carbon foam or the combination thereof is configured to augment heat transfer and enhance acoustic absorption.

In accordance with yet another aspect of the present technique an outlet guide vane assembly is provided. The outlet guide vane assembly comprises one or more outlet guide vanes, wherein each of the one or more outlet guide vanes comprises a first surface and a second surface, and wherein the one or more outlet guide vanes are disposed between an inner wall and an outer wall of an engine and a surface cooler layer disposed on at least a portion of the first surface, the second surface, or both of the one or more outlet guide vanes, and comprising a plurality of fins, wherein the plurality of fins are configured to augment heat transfer and enhance acoustic absorption, and wherein the plurality of fins comprise a metal foam, a carbon foam, or a combination thereof.

In accordance with yet another aspect of the present technique a method of forming an outlet guide vane assembly is provided. The method comprises disposing a surface cooler layer on at least a portion of a first surface, a second surface, or both, of one or more outlet guide vanes, wherein the one or more outlet guide vanes comprise a metal foam, a carbon foam or a combination thereof, and wherein the metal foam, the carbon foam or the combination thereof is configured to augment heat transfer and enhance acoustic absorption.

In accordance with still another aspect of the present technique an engine is provided. The engine comprises a core engine and an outlet guide vane assembly comprising one or more outlet guide vanes, wherein each of the one or more outlet guide vanes comprises a first surface and a second surface, and wherein the one or more outlet guide vanes are disposed between an inner wall and an outer wall of the engine and a surface cooler layer disposed between the second surface of a first outlet guide vane and the first surface of a second outlet guide vane and wherein the surface cooler layer comprises a metal foam, a carbon foam, or a combination thereof, wherein the metal foam, the carbon foam, or the combination thereof is configured to augment heat transfer and enhance acoustic absorption.

In accordance with still another aspect of the present technique an engine is provided. The engine comprises a core engine and an outlet guide vane assembly comprising one or more outlet guide vanes, wherein each of the one or more outlet guide vanes comprises a first surface and a second surface, and wherein the one or more outlet guide vanes are disposed between an inner wall and an outer wall of the engine and a surface cooler layer disposed on at least a portion of the first surface, the second surface, or both, of the one or more outlet guide vanes, wherein the one or more outlet guide vanes comprise a metal foam, a carbon foam, or a combination thereof, and wherein the metal foam, the carbon foam, or the combination thereof is configured to augment heat transfer and enhance acoustic absorption.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention relate to outlet guide vanes (OGVs) and more particularly to the design of an outlet guide vane (OGV) for use in an engine such as an aircraft engine. The exemplary OGV may also be utilized in acoustic absorption as well as for providing efficient cooling. As used herein, the OGVs are applicable to various types of turbomachinery applications such as, but not limited to, turbojets, turbofans, turbo propulsion engines, aircraft engines, gas turbines, steam turbines, wind turbines, and water turbines.

Figure 1:
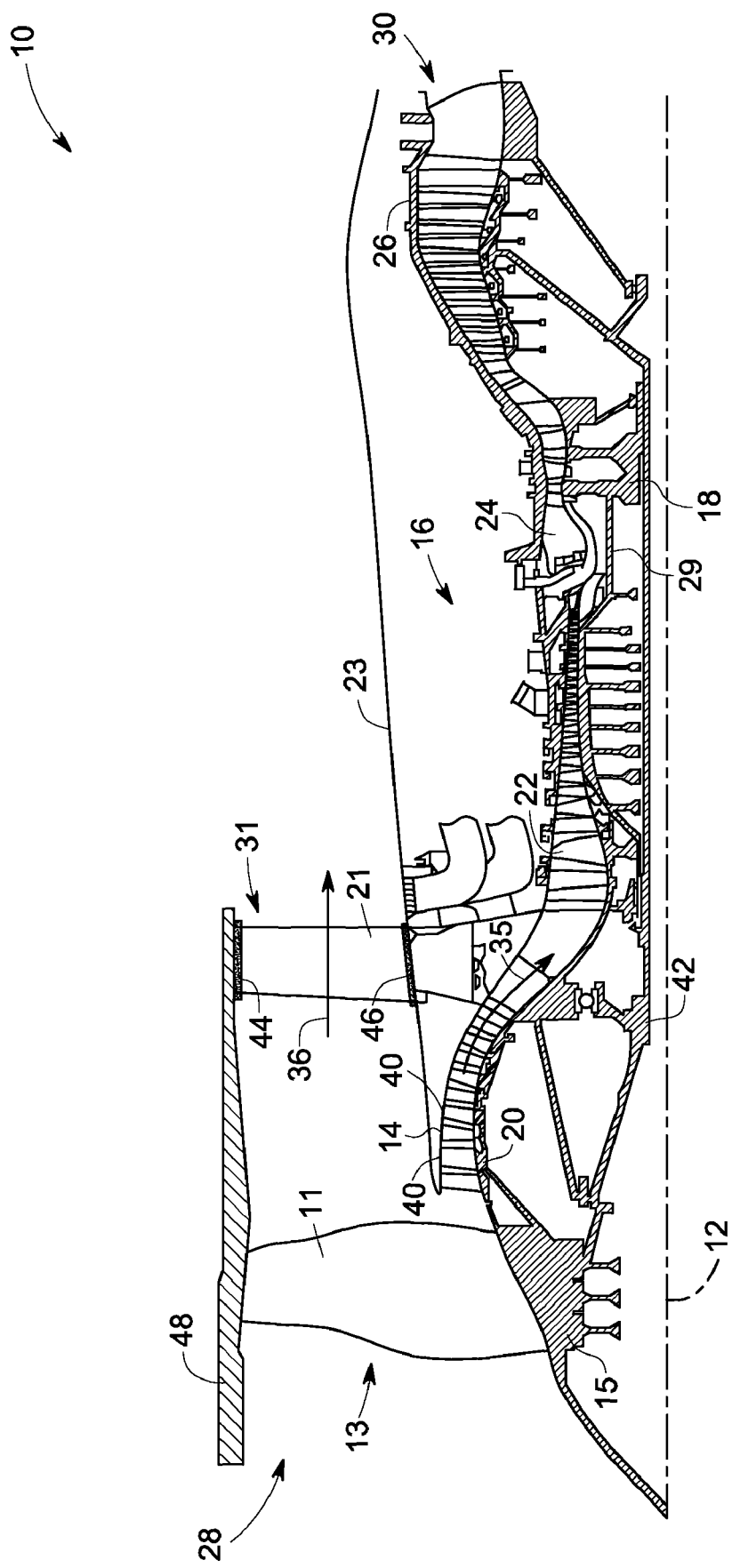
FIG. 1 is a diagrammatic illustration of an engine, in accordance with the aspects of the present technique.

FIG. 1 is a schematic illustration of an exemplary aircraft engine assembly 10 in accordance with the present invention. Reference numeral 12 may be representative of a centerline axis 12. In the exemplary embodiment, the engine assembly 10 includes a fan assembly 13, a booster compressor 14, a core gas turbine engine 16, and a low-pressure turbine 26 that may be coupled to the fan assembly 13 and the booster compressor 14. The fan assembly 13 includes a plurality of rotor fan blades 11 that extend substantially radially outward from a fan rotor disk 15, as well as a plurality of outlet guide vanes 21 that may be positioned downstream of the fan blades 11. The core gas turbine engine 16 includes a high-pressure compressor 22, a combustor 24, and a high-pressure turbine 18. The booster compressor 14 includes a plurality of rotor blades 40 that extend substantially radially outward from a compressor rotor disk 20 coupled to a first drive shaft 42. The compressor 22 and the high-pressure turbine 18 are coupled together by a second drive shaft 29. The engine assembly 10 also includes an intake side 28, a core engine exhaust side 30, and a fan exhaust side 31.

During operation, the fan assembly 13 compresses air entering the engine 10 through the intake side 28. The airflow exiting the fan assembly 13 is split such that a portion 35 of the airflow is channeled into the booster compressor 14 and a remaining portion 36 of the airflow bypasses the booster compressor 14 and the core turbine engine 16 and exits the engine 10 through the fan exhaust side 31. This bypass air 36 flows past and interacts with the outlet guide vanes 21 creating unsteady pressures on the stator surfaces as well as in the surrounding airflow that radiate as acoustic waves. The plurality of rotor blades 40 compresses and delivers the compressed airflow 35 towards the core gas turbine engine 16. Furthermore, the airflow 35 is further compressed by the high-pressure compressor 22 and is delivered to the combustor 24. Moreover, the compressed airflow 35 from the combustor 24 drives the rotating turbines 18 and 26 and exits the engine 10 through the exhaust side 30.

As previously noted, in certain presently available commercial engines, separate heat exchangers and acoustic absorbers are employed to address the heat dissipation and noise reduction needs. Furthermore, high heat loads may lead to sub-optimal performance of certain heat exchangers. In addition, use of certain other heat exchangers leads to dramatic reduction in surface area available for the acoustic absorber. In accordance with exemplary aspects of the present technique, an outlet guide vane configured to function as a heat exchanger as well as an acoustic absorber is presented. More particularly, the exemplary outlet guide vane 21 may be configured to simultaneously address the heat exchange requirements and acoustic absorption needs of a turbomachine, such as an aircraft engine 10, for example.

Moreover, the engine 10 may typically include an outlet guide vane assembly (not shown in FIG. 1). This OGV assembly may include a plurality of circumferentially spaced predominantly radially extending outlet guide vanes, such as the OGV 21. In addition, the OGVs 21 may extend radially across the flowpath 36 of the bypass air between an inner wall 23 and an outer wall 48 that are disposed coaxially about the centerline axis 12. The OGVs 21 are fixedly joined to the outer and inner walls 48 and 23 respectively. In one embodiment, the one or more OGVs 21 may be disposed between the inner wall 23 and the outer wall 48 of the engine 10.

In one embodiment, an exemplary layer configured to function as a heat exchanger as well as acoustic absorber for the one or more OGVs in the OGV assembly is presented. This layer may be referred to as a surface cooler layer. In one embodiment the surface cooler layer may be disposed on a surface of the one or more OGVs. In another embodiment, the surface cooler layer may be disposed on at least a portion of a first surface, a second surface, or both of the one or more OGVs. Further, in another embodiment the surface cooler layer may be disposed on or adjacent to a tip casing surface of the OGV 21. This surface cooler layer may be represented by reference numeral 44. Alternatively, the exemplary surface cooler layer may also be disposed on or adjacent to a hub casing surface of the OGV 21. This surface cooler layer may be represented by reference numeral 46. In one embodiment, the outer wall 48 may be a tip casing surface of the engine 10. Further, the inner wall 23 may be a hub-casing surface of the engine 10. More particularly, the exemplary surface cooler layers 44, 46 may be disposed at the inner wall 23 and the outer wall 48 between the plurality of OGVs, such as OGV 21. The arrangement of exemplary surface cooler layer that may function as a heat exchanger as well as an acoustic absorber in accordance with the present embodiment will be described in greater detail with reference to FIG. 11.

Figure 2:
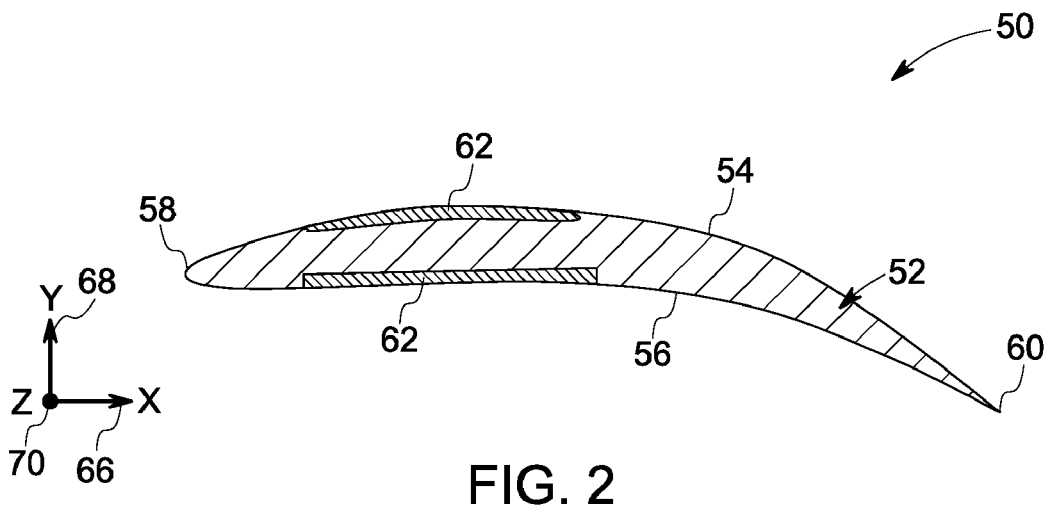
FIG. 2 is an axial cross sectional view of an exemplary outlet guide vane, in accordance with aspects of the present technique.

Referring now to FIG. 2, an axial cross section of an exemplary outlet guide vane 50 is illustrated. As illustrated in FIG. 2, the outlet guide vane 50 typically has an airfoil like cross-section 52 that includes a leading edge 58, a relatively thick middle section and a thin trailing edge 60. Furthermore, as depicted in FIG. 2, the OGV 50 may include a first surface 54 and a second surface 56. The first surface 54 may generally be referred to as a suction side, while the second surface 56 may generally be referred to as a pressure side. It may be noted that the terms first surface and suction side may be used interchangeably. Also, the terms second surface and pressure side may be used interchangeably. In the presently illustrated embodiment, the suction side 54 and the pressure side 56 are shown as extending axially between the leading edge 58 and the trailing edge 60.

It may be noted that, during engine operation the compressor compresses inlet airflow, thereby heating the air. The hot air coming from the core heats the coolant liquid, this coolant liquid is circulated to cool the various parts of the engine. Further, the coolant liquid may be heated by various parts of the engine, such as the bearings. Accordingly it may be desirable to dissipate heat from the engine through the OGVs. In addition, it may also be desirable to reduce noise levels in and around the OGVs.

Accordingly, a surface cooler 62 configured to function as a surface cooler and an acoustic absorber is presented. In one embodiment, the surface cooler 62 may include a surface cooler layer. More particularly, the exemplary surface cooler layer 62 may be configured to simultaneously address the heat exchange requirements and acoustic absorption needs of the OGV assembly in a turbomachine such as an aircraft engine, for example. Hereinafter, the term "surface cooler layer" may be used to refer to the surface cooler layer 62 configured to facilitate heat dissipation and acoustic absorption in the OGVs.

In accordance with aspects of the present technique, the exemplary surface cooler layer 62 may include a metal foam. In an alternative embodiment, the surface cooler layer may include a carbon foam. It may be noted that the exemplary surface cooler layer 62 may include foams having high thermal conductivity, in certain other embodiments. Moreover, in one embodiment the exemplary surface cooler layer 62 may be disposed on at least a portion of the first surface 54 or the second surface 56 or both to facilitate heat transfer, as well as provide acoustic absorption according to embodiments of the present invention as will be described in greater detail hereinafter. Further, the surface cooler layer 62 may include material such as, but not limited to, a metal foam, a carbon foam, or a combination thereof. It may be noted that the exemplary surface cooler layer 62 may include foams having high thermal conductivity, in certain other embodiments. By way of example, foams may include carbon foams having a thermal conductivity in the range from about 150W/m*K to about 390W/m*K. As will be appreciated, a metal foam is a cellular structure consisting of a solid metal where a large volume fraction includes gas-filled pores. The pores may be sealed (closed-cell foam), or they may form an interconnected network (open-cell foam). Typically, these metal foams have a very high porosity. In other words typically 75-95% of the volume consists of void spaces. It may be noted, that the thermal conductivity of metal foam may vary greatly, depending not only on the material, the foam porosity, topography and tortuosity, but also on finer details of the integrity of the webs that interconnect various cells in a foam.

Furthermore, in accordance with aspects of present technique, the metal foams are used to augment heat transfer in addition to providing noise reduction. Specifically, the metal foams may be employed to augment heat transfer/cooling as the metal foams provide a good combination of enhanced thermal conduction, with a large surface area for convection, while also having a comparatively low mass. In addition, the porous metal foam may also be configured to absorb noise generated by various parts in the engine 10. In other words, the metal foam of the surface cooler layer 62 disposed on the outlet guide vane 50 may be configured to facilitate reduction of noise in the engine 10 by absorbing the noise in the engine 10. Consequently, the metal foam may be configured to provide means to facilitate heat exchange and acoustic attenuation in one low-mass package.

With continuing reference to FIG. 2, reference numeral 66 is generally representative of an X-direction, while a Y-direction is represented by reference numeral 68. Also, reference numeral 70 is representative of a Z-direction. It may be noted that the airflow is largely in the X-direction 66. It may also be noted that in the embodiment illustrated in FIG. 2, the surface cooler layer 62 disposed on the first surface 54 and the second surface 56 may be disposed such that the surface cooler layer 62 lies within the boundary of the OGV 50. Alternatively, the surface cooler layer 62 may be disposed on the first surface 54 and the second surface 56 such that the surface cooler layer 62 may protrude into the airflow.

As previously noted, the coolant fluid that is circulated to cool the engine is heated by hot air in the core engine. Further, the coolant fluid may also be heated by various parts of the engine. This heated coolant fluid may be channeled to the OGVs such as OGV 50. The heat from the coolant fluid may be transferred from the walls of a plurality of tubes (not shown) and dissipated into the airflow via the surface cooler layer 62 disposed on the first surface 54 or the second surface 56 of the OGV 50, thereby cooling the coolant fluid.

Figure 3:
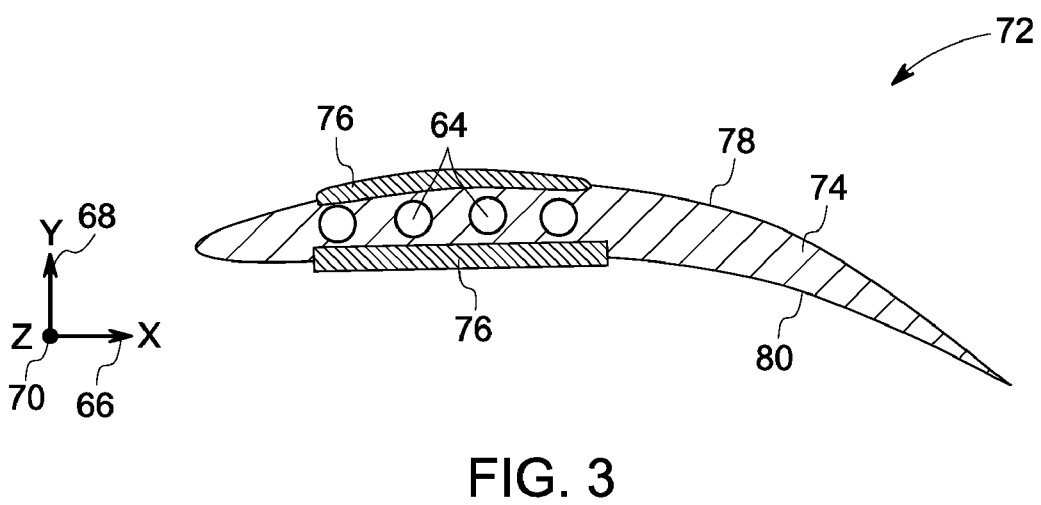
FIG. 3 is an axial cross sectional view of another exemplary outlet guide vane, in accordance with aspects of the present technique.

Referring now to FIG. 3, an exemplary embodiment of an OGV 72 for use in the engine 10 of FIG. 1 is illustrated. Also, the OGV 72 has an airfoil like cross-section 74. In addition, the OGV 72 may include a first surface 78 and a second surface 80. As illustrated a surface cooler layer 76 may be disposed on at least a portion of a first surface 78, a second surface 80 or both. As previously noted, the surface cooler layer 76 may include a metal foam, a carbon foam, or a combination thereof. In the embodiment illustrated in FIG. 3, the surface cooler layer 76 may be disposed in a manner such that the layer 76 protrudes into the airflow for enhanced heat transfer.

Further, as illustrated in FIG. 3, at least one and typically a plurality of tubes 64 may be disposed in the exemplary OGV 72. In one embodiment, the plurality of tubes 64 may be embedded in the OGV 72. The plurality of tubes 64 may be configured to aid in cooling a fluid that may be heated by various parts of the engine. As will be appreciated, a fluid such as oil may be heated by parts of the engine such as bearings. This heated fluid (oil) may be channeled through the OGV 72 via the tubes 64. The heat from the fluid may be transferred from the walls of the tubes 64 and dissipated into the airflow via the surface cooler layer 76 disposed on the first surface 78 and/or the second surface 80 of the OGV 72. This cooled fluid may then be carried back to the parts in the engine 10. In one embodiment the dimensions of tubes may be from about 0.020 inch to about 0.6 inch in diameter. The plurality of tubes 64 may be made of material such as, but not limited to, aluminum. Also, in one embodiment, the fluid may include oil or water.

Figure 4:
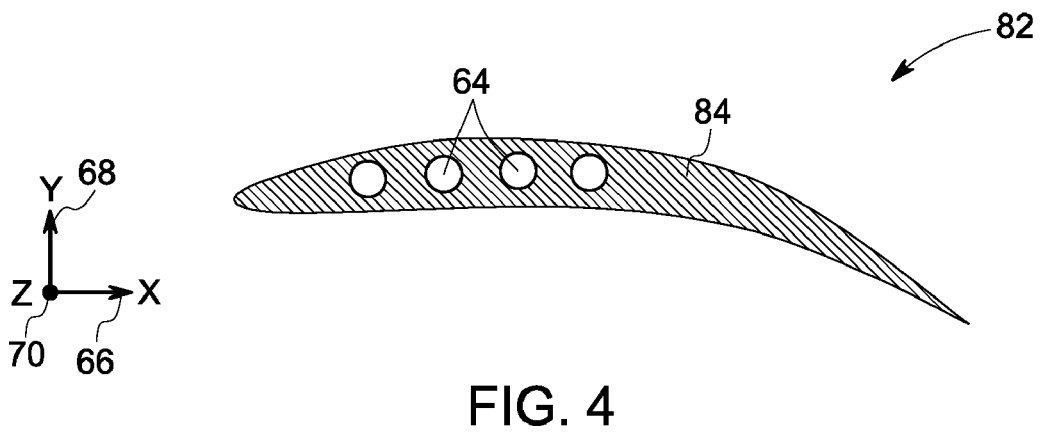
FIG. 4 is an axial cross sectional view of yet another exemplary outlet guide vane, in accordance with aspects of the present technique.

FIG. 4 illustrates another embodiment of an exemplary outlet guide vane 82, according to one aspect of the present technique. In the embodiment illustrated in FIG. 4, the entire outlet guide vane 82 may be formed from a material such as but not limited to a metal foam 84, a carbon foam, or a combination thereof. In an alternative embodiment, the outlet guide vane 82 may include a solid metal, a composite, and so forth. Additionally, a plurality of tubes 64 may be disposed in the outlet guide vane 82, where the tubes 64 are configured to channel a fluid through the exemplary OGV 82, thereby enabling cooling of a fluid that is heated by various parts of the engine 10.

Figure 5:
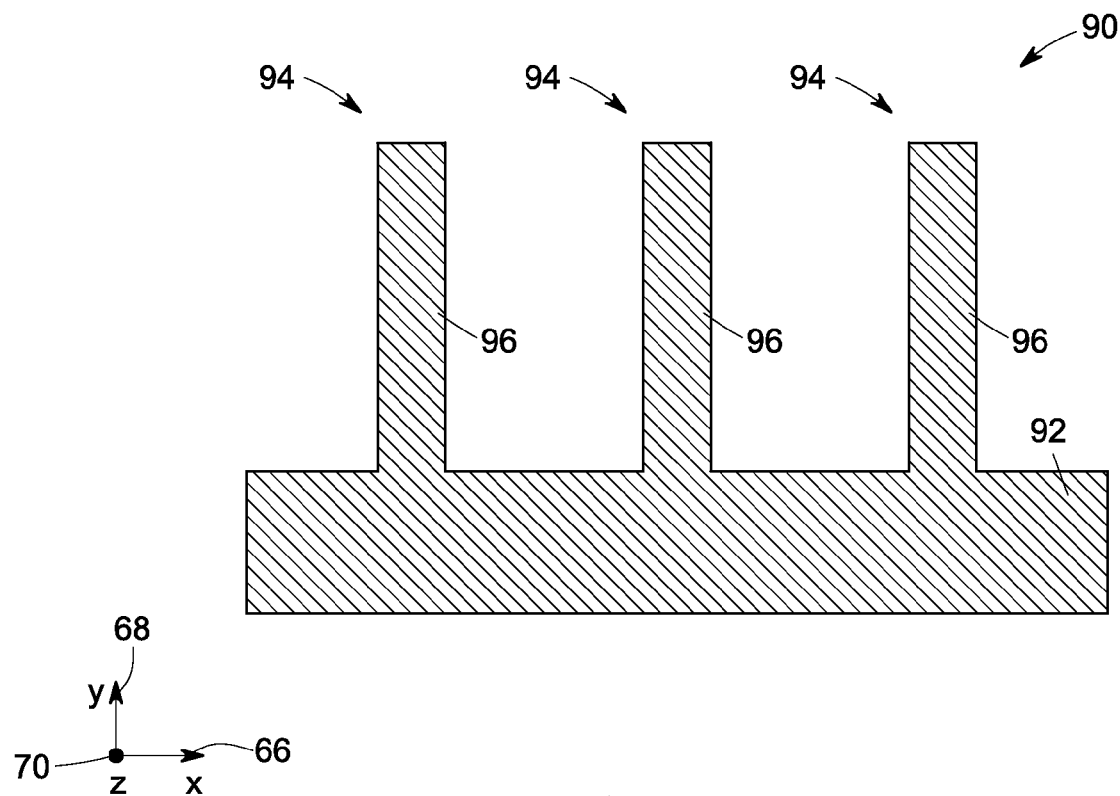
FIG. 5 is a diagrammatical illustration of a portion of an exemplary surface cooler layer, in accordance with aspects of the present technique.

Turning now to FIG. 5, a sectional view 90 of an exemplary surface cooler layer 92 disposed on the outlet guide vane is illustrated. As previously noted, a surface cooler layer 92 may be disposed on a first surface, a second surface, or both the first surface and the second surface of the OGV. In accordance with exemplary aspects of the present technique, the surface cooler layer 92 includes a metal foam 96, a carbon foam, or a combination thereof. The layer may be machined or formed into a plurality of fins 94. These fins 94 may be oriented parallel to the airflow, such as the airflow 36 (see FIG. 1), in one embodiment. Alternatively, it may be noted that the fins 94 as illustrated in FIG. 5 may be oriented substantially parallel to the airflow.

By implementing the foam fins 94 to protrude into the main airflow, the area of heat transfer may be increased, thereby augmenting heat transfer. Moreover, the fins 94 may be arranged in a manner so as to effectively aid in enhancing acoustic absorption. In addition to forming the plurality of foam fins 94, the metal foam 96 may also be machined and/or formed into pins and/or other structures configured to effectively increase heat transfer and enhance acoustic absorption.

Figure 6:
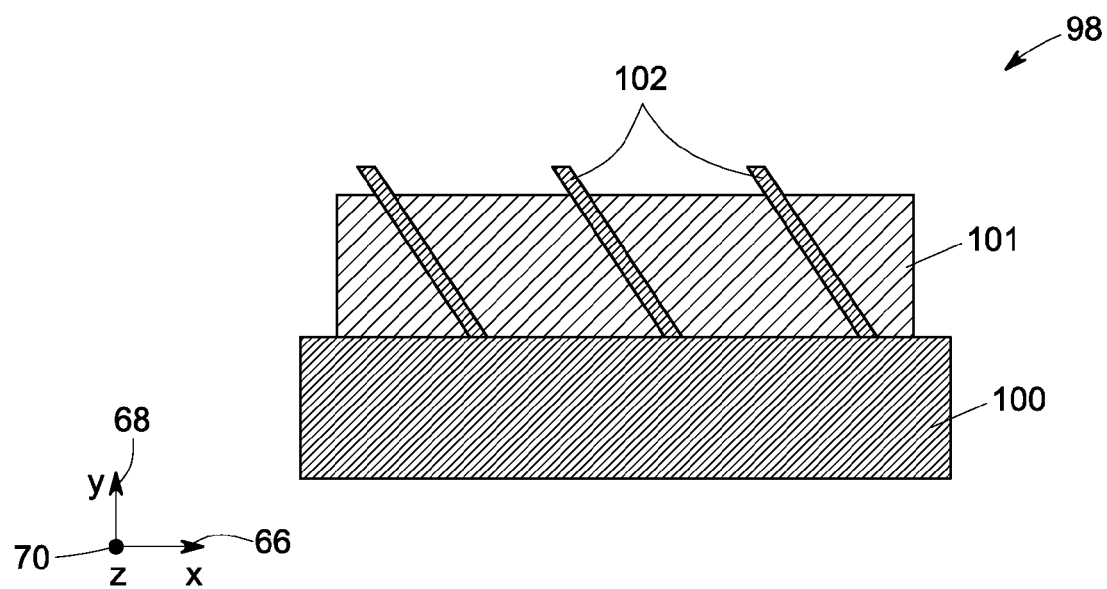
FIG. 6 is a diagrammatical illustration of a portion of another exemplary surface cooler layer, in accordance with aspects of the present technique.

Furthermore, FIG. 6 illustrates an axial cross-section of a surface cooler layer 98 disposed on an outlet guide vane, such as the outlet guide vane 21 of FIG. 1, in accordance with aspects of the present technique. As illustrated, the surface cooler layer 98 may include a plurality of fins 102 that may be inclined at an angle of about 5 degrees to an angle of about 90 degrees relative to the first surface or the second surface of the OGV. In the present embodiment, the plurality of fins 102 may be inclined at an angle of about 70 degrees relative to the first surface 100. Alternatively, the plurality of fins may be inclined at an angle of about 70 degrees relative to a second surface of the OGV. As previously noted, an exemplary surface cooler layer 98 may be disposed on the first surface 100 or the second surface, or both. The surface cooler layer 98 includes a metal foam 101, a carbon foam, or a combination thereof disposed between the plurality of fins 102 to effectively enhance acoustic absorption. In accordance with further aspects of the present technique, porosity of the metal foam may be varied. More particularly, the porosity of the metal foam may be intentionally varied between different length scales to facilitate absorption of different acoustic wavelengths.

Figure 7:
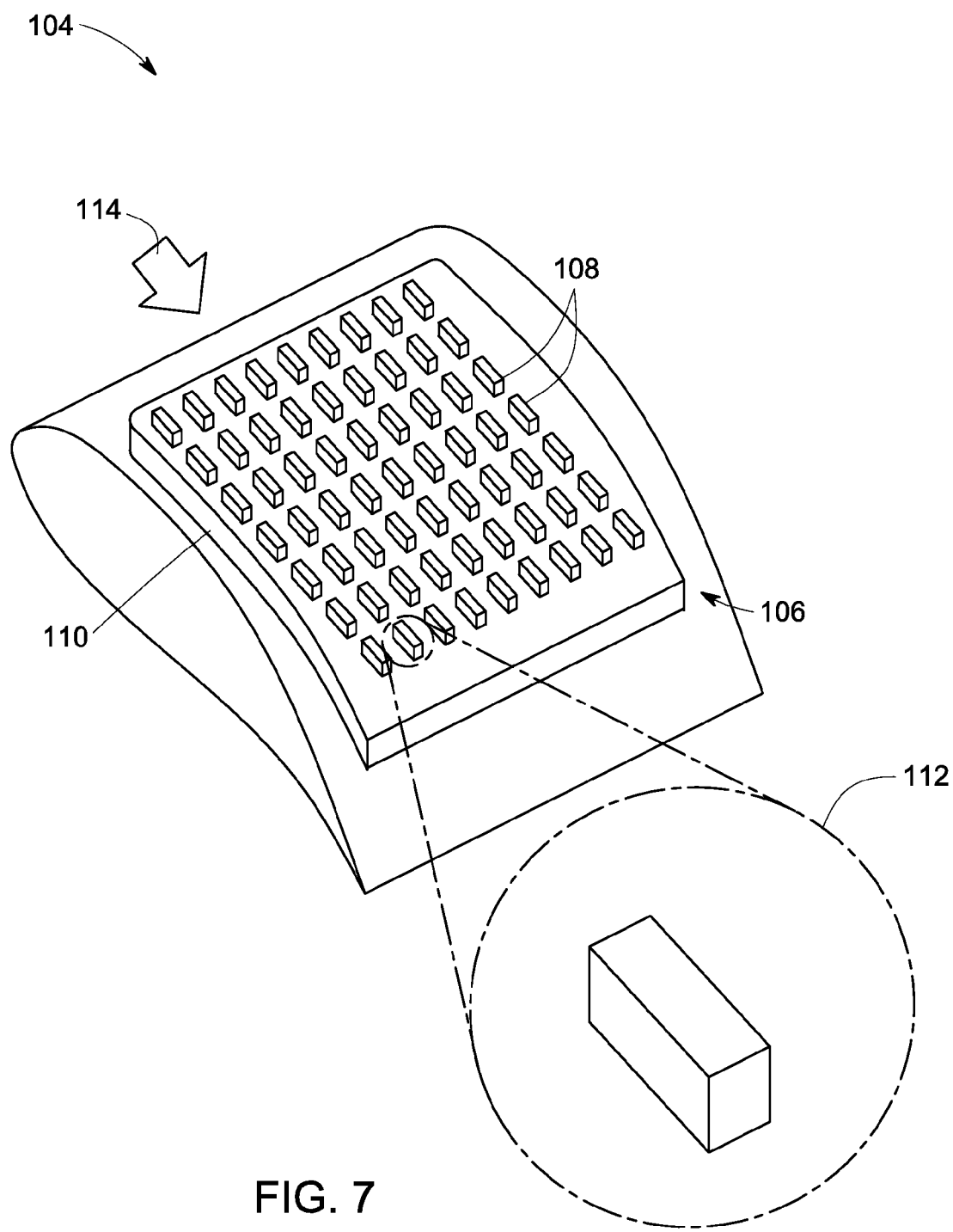
FIG. 7 is a perspective view of an exemplary outlet guide vane illustrating an exemplary surface cooler layer having fins, according to aspects of the present technique.

FIG. 7 illustrates a perspective view 104 of an exemplary outlet guide vane 106 with a plurality of fins 108 disposed on a surface cooler layer 110. An exploded view 112 of a fin 108 is illustrated. As noted hereinabove, the fins 108 are configured to facilitate enhanced heat transfer in addition to providing enhanced acoustic absorption. Reference numeral 114 is representative of an airflow direction. In accordance with further aspects of the present technique, the heat transfer capability of the fins may be further enhanced, and will be explained in greater detail with reference to FIGS. 8-10.

Figure 8:
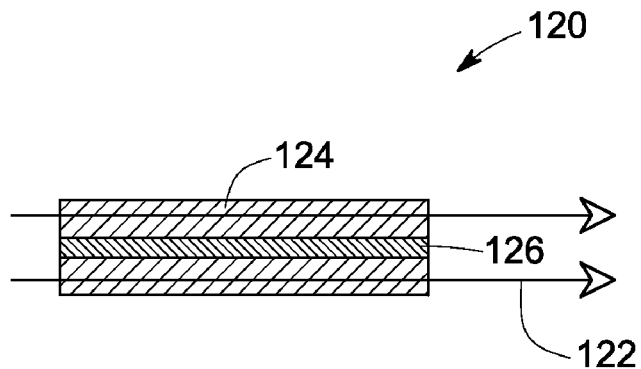
FIG. 8 is a diagrammatical illustration of a top view of an exemplary fin, in accordance with aspects of the present technique.

Turning now to FIG. 8, a top view 120 of an exemplary fin 124, in accordance with aspects of the present technique, is illustrated. The fin 124 may be formed from a metal foam. Further, a solid conducting material or a solid metal blade 126 may be disposed in the fin 124 to create an effective heat conduction path, thereby facilitating transfer of heat from a first surface or a second surface of an exemplary outlet guide vane to the surface of the fin 124. In one embodiment, a solid metal blade 126 may be disposed in the middle of the fin 124. Also, in another embodiment, the solid metal blade 126 may include a material such as, but not limited to, thermal pyrolytic graphite. Further, reference numeral 122 is representative of a direction of airflow. It may be noted that in the present example, the airflow 122 is parallel to the fin 124.

Figure 9:
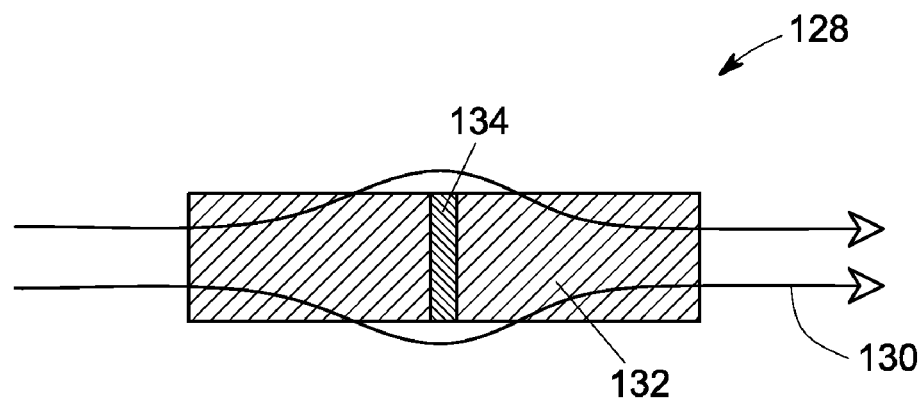
FIG. 9 is a diagrammatical illustration of another exemplary fin for use in the surface cooler layer, in accordance with aspects of the present technique.

In another embodiment, the solid metal blade 126 of FIG. 8 may be placed in a direction that is substantially perpendicular to the airflow as depicted in FIG. 9. More particularly, FIG. 9 illustrates a top view 128 of another exemplary fin 132 including a solid metal blade 134 disposed in the fin 132 such that the solid metal blade 134 is substantially perpendicular to airflow 130. The perpendicular orientation of the solid metal blade 134 forces the airflow 130 around carbon foam or metal foam of the fin 132, thereby facilitating enhanced heat transfer.

In certain other embodiments a fin such as the fin 108 of FIG. 7, may include a solid blade parallel to the airflow and another solid blade that is substantially perpendicular to the airflow.

Figure 10:
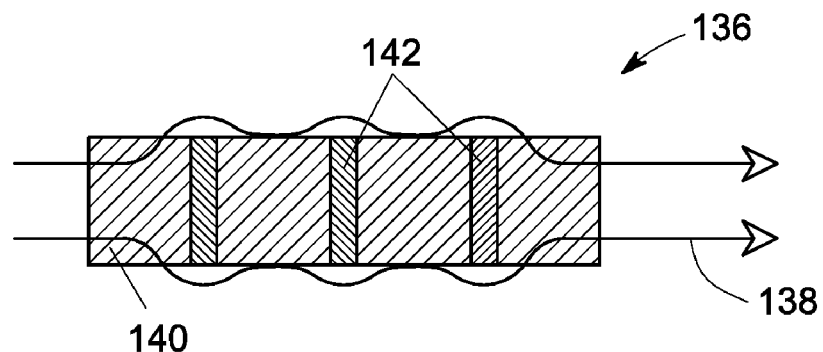
FIG. 10 is a diagrammatical illustration of a top view of another exemplary fin for use in the surface cooler layer, in accordance with aspects of the present technique.

FIG. 10 illustrates yet another embodiment of a fin. A top view 136 of an exemplary fin 140 is depicted in FIG. 10. In this embodiment, a plurality of solid metal blades 142 may be disposed in the exemplary fin 140 such that the blades 142 are perpendicular to the airflow 138. By including the plurality of blades 142, the fin 140 may be divided into a plurality of sectors. The airflow 138 is forced around the metal foam as depicted to optimize heat transfer as well as aerodynamic performance of the fin.

Figure 11:
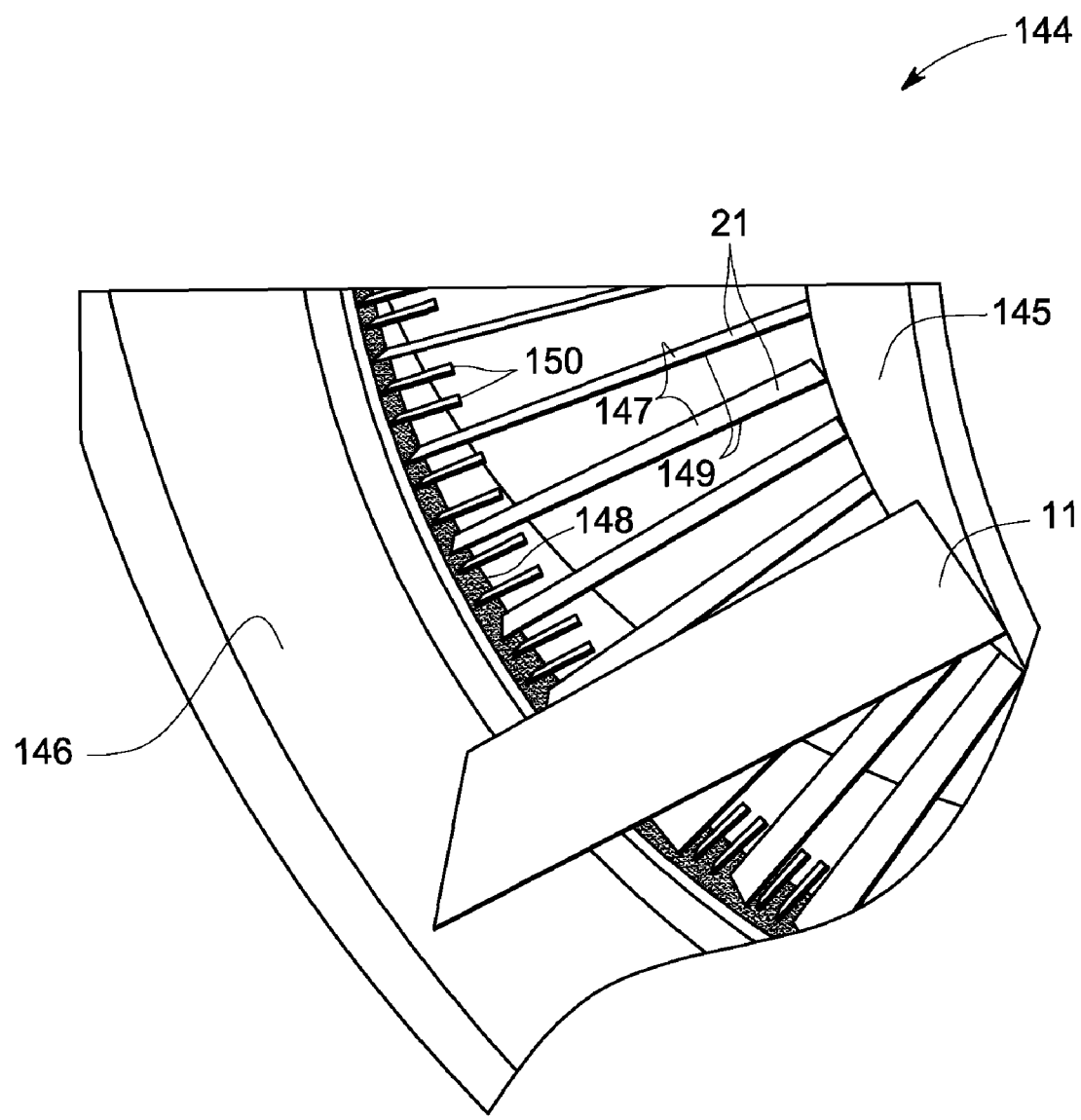
FIG. 11 is a perspective view of a section of engine, in accordance with aspects of the present technique.

In accordance with aspects of the present technique, the surface cooler layers may be disposed between the outer wall 48 and the inner wall 23 respectively, as illustrated in FIG. 1. FIG. 11 illustrates a perspective view 144 of a section of the engine 10 (see FIG. 1) with a plurality of OGVs 21. An exemplary surface cooler layer 148 is shown as being disposed on the outer wall 146 or between the OGVs 21. More particularly, the surface cooler layer 148 may include a plurality of fins 150. In one embodiment the fins 150 may have a shape that is substantially similar to the shape of the OGVs 21. Furthermore, the surface cooler layer 148 with a plurality of fins 150 may also be disposed on the inner wall 145. In one embodiment, the surface cooler layer 148 may be disposed between a second surface 149 of a first OGV and a first surface 147 of a second OGV. In certain embodiments, the surface cooler layer 148 may be disposed at the inner wall 145 or the outer wall 146 or both the inner wall 145 or the outer wall 146 of the engine 10 (see FIG. 1).

Figure 12:
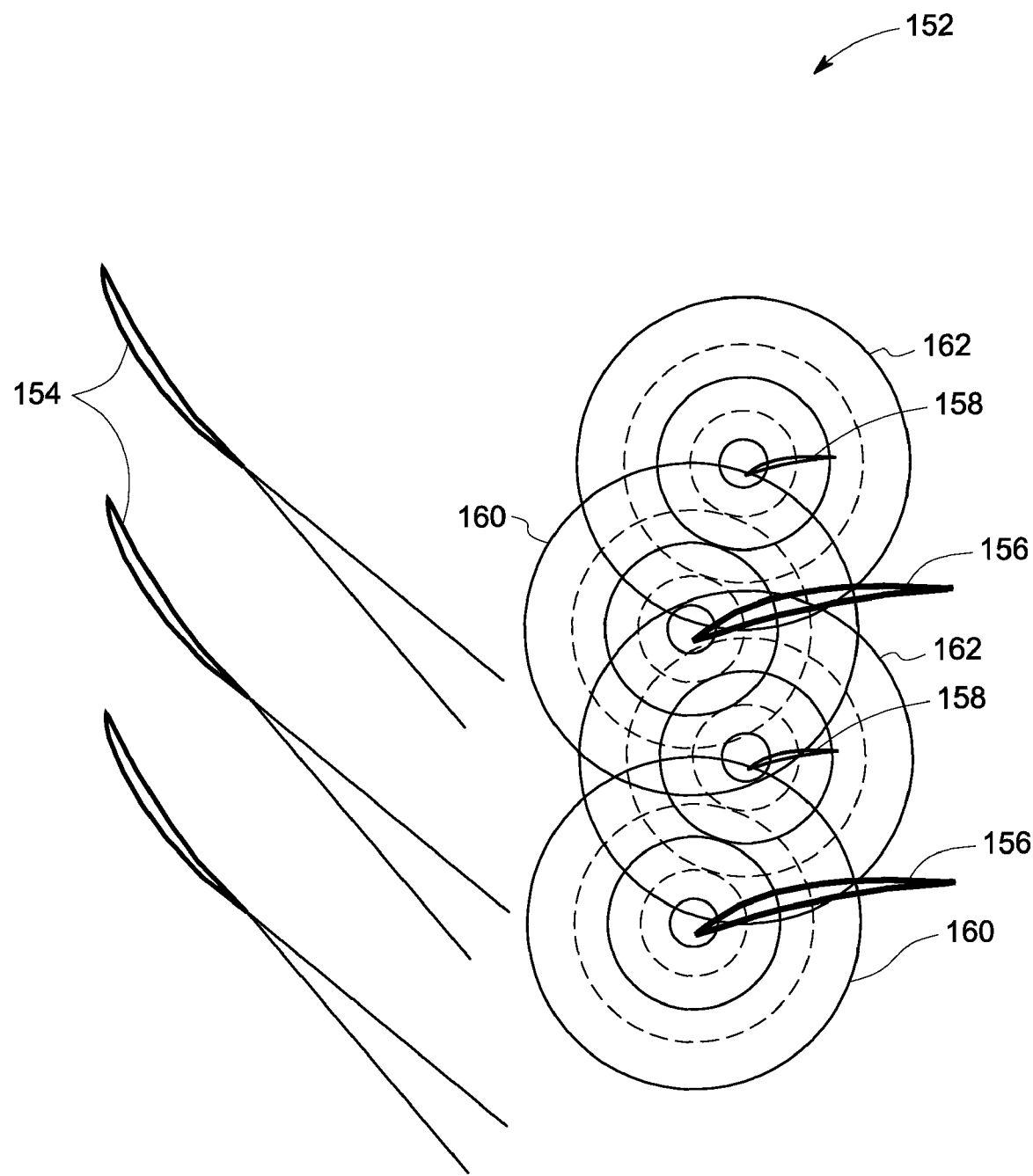
FIG. 12 is a schematic radial view of a two-dimensional cross-section through an exemplary set of fan blades and a set of outlet guide vanes and a set of exemplary fins in the engine of FIG. 1.

FIG. 12 is a schematic diagram illustrating a radial view 152 of a two dimensional cross-section through an exemplary set of fan blades 154, a set of outlet guide vanes 156, and a tandem OGV surface cooler fins 158 in the turbomachinery system 10 of FIG. 1. As previously noted, the outlet guide vanes 156 may include a plurality of fins (not shown in FIG. 12). Further, the surface cooler layer 148 (see FIG. 11) including a plurality of fins 158 may be fabricated as a tandem OGV surface cooler fin such as a plurality of fins 150 of FIG. 11.

The plurality of fins may be arranged in a way so as to minimize turbomachinery interaction noise by acoustic cancellation of dominant tones. The plurality of fins 158 may be arranged as a tandem or a multi-element OGV. Furthermore, the plurality of fins 158 emanating from a surface cooler layer may be disposed on the inner wall, the outer wall, or both. In one embodiment, the plurality of fins may be fabricated as a secondary, a tertiary and so forth part-span OGVs protruding from the inner wall, the outer wall or both the inner wall and the outer wall of an engine. The acoustic scattering of the fins 158 may destructively interfere with the acoustics of the outlet guide vanes 156. As illustrated, the acoustic waves 162 emanating from the fins 158 and the acoustic waves 160 emanating from the OGVs 156 are schematically represented by concentric circles. The acoustic waves 160 from each OGV 156 destructively interfere with the acoustic waves 162 from each fin 158 thereby resulting in a significant or desirable reduction in noise.

The various embodiments of the exemplary outlet guide vane described hereinabove provide augmented heat transfer and improved acoustic absorption. Additionally, the exemplary outlet guide vane can be used to reduce the mass of a turbomachine. Further, the embodiments of the present invention simultaneously provide improved heat transfer and acoustic absorption thereby facilitating better fuel consumption by allowing significant weight reduction for future engines by either reducing engine length or diameter.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An outlet guide vane assembly, comprising:
   one or more outlet guide vanes, wherein each of the one or more outlet guide vanes comprises a first surface and a second surface, and wherein the one or more outlet guide vanes are disposed between an inner wall and an outer wall of an engine; and
   a surface cooler layer disposed on at least a portion of the first surface, the second surface, or both of the one or more outlet guide vanes, wherein the surface cooler layer comprises a metal foam, a carbon foam, or a combination thereof, wherein the metal foam, the carbon foam or the combination thereof is configured to augment heat transfer and enhance acoustic absorption.

2. The outlet guide vane assembly of claim 1, further comprising disposing the surface cooler layer between the one or more outlet guide vanes.

3. The outlet guide vane assembly of claim 1, wherein the surface cooler layer protrudes into airflow.

4. The outlet guide vane assembly of claim 1, wherein the one or more outlet guide vanes comprise a metal foam, a carbon foam or a combination thereof.

5. The outlet guide vane assembly of claim 1, wherein the one or more outlet guide vanes further comprise a plurality of tubes configured to carry fluid to be cooled.

6. The outlet guide vane assembly of claim 1, wherein the surface cooler layer comprises a plurality of fins.

7. The outlet guide vane assembly of claim 6, wherein the plurality of fins comprises a metal foam, a carbon foam, or a combination thereof.

8. The outlet guide vane assembly of claim 6, wherein the plurality of fins further comprises at least one solid blade disposed in the metal foam and configured to augment heat transfer through the length of the fins.

9. The outlet guide vane assembly of claim 8, wherein the solid blade comprises a metal, thermal pyrolytic graphite, or a combination thereof.

10. The outlet guide vane assembly of claim 8, wherein the solid blade is aligned in a direction parallel to airflow.

11. The outlet guide vane of claim 8, wherein the solid blade is aligned at an angle to the airflow.

12. The outlet guide vane of claim 11, wherein the solid blade is aligned in a direction perpendicular to the airflow.

13. An outlet guide vane assembly, comprising:
   one or more outlet guide vanes, wherein each of the one or more outlet guide vanes comprises a first surface and a second surface, and wherein the one or more outlet guide vanes are disposed between an inner wall and an outer wall of an engine; and
   a surface cooler layer disposed between a second surface of a first outlet guide vane and a first surface of a second outlet guide vane, and wherein the surface cooler layer comprises a metal foam, a carbon foam, or a combination thereof, wherein the metal foam, the carbon foam or the combination thereof is configured to augment heat transfer and enhance acoustic absorption.

14. The outlet guide vane assembly of claim 13, wherein the surface cooler layer is disposed on the inner wall, the outer wall or both the inner wall and the outer wall and between the one or more outlet guide vanes.

15. The outlet guide vane assembly of claim 13, wherein the surface cooler layer comprises a plurality of fins.

16. The outlet guide vane assembly of claim 15, wherein the plurality of fins comprise a tandem or a multi-element outlet guide vanes.

17. The outlet guide vane assembly of claim 15, wherein the plurality of fins comprises a metal foam, a carbon foam, or a combination thereof.

18. The outlet guide vane assembly of claim 15, wherein the plurality of fins further comprises at least one solid blade disposed in the metal foam and configured to augment heat transfer through the length of the fins.

19. The outlet guide vane assembly of claim 18, wherein the solid blade comprises a metal, thermal pyrolytic graphite, or a combination thereof.

20. The outlet guide vane assembly of claim 18, wherein the solid blade is aligned in a direction parallel to airflow.

21. The outlet guide vane of claim 18, wherein the solid blade is aligned at an angle to the airflow.

22. An outlet guide vane assembly, comprising:
   one or more outlet guide vanes, wherein each of the one or more outlet guide vanes comprises a first surface and a second surface, and wherein the one or more outlet guide vanes are disposed between an inner wall and an outer wall of an engine; and
   a surface cooler layer disposed on at least a portion of the first surface, the second surface, or both of the one or more outlet guide vanes, and comprising a plurality of fins, wherein the plurality of fins is configured to augment heat transfer and enhance acoustic absorption, and wherein the plurality of fins comprises a metal foam, a carbon foam, or a combination thereof.

23. The outlet guide vane assembly of claim 22, wherein the plurality of fins further comprises at least one solid blade disposed in the metal foam, and configured to augment heat transfer through a length of the fins.

24. A method of forming an outlet guide vane assembly, comprising:
  disposing a surface cooler layer on at least a portion of a first surface, a second surface, or both, of one or more outlet guide vanes, wherein the one or more outlet guide vanes comprise a metal foam, a carbon foam or a combination thereof, and wherein the metal foam, the carbon foam or the combination thereof is configured to augment heat transfer and enhance acoustic absorption.

25. The method of claim 24, further comprising disposing a plurality of tubes in the one or more outlet guide vanes, wherein the plurality of tubes is configured to carry fluid to be cooled.

26. The method of claim 24, further comprising machining the first surface, the second surface, or both, of the one or more outlet guide vanes to form a plurality of fins, wherein the plurality of fins is configured to augment heat transfer and acoustic absorption.

27. An engine, comprising:
  a core engine; and
  an outlet guide vane assembly, comprising:
    one or more outlet guide vanes, wherein each of the one or more outlet guide vanes comprises a first surface and a second surface, and wherein the one or more outlet guide vanes are disposed between an inner wall and an outer wall of the engine; and
    a surface cooler layer disposed between the second surface of a first outlet guide vane and the first surface of a second outlet guide vane and wherein the surface cooler layer comprises a metal foam, a carbon foam, or a combination thereof, wherein the metal foam, the carbon foam, or the combination thereof is configured to augment heat transfer and enhance acoustic absorption.

28. The engine of claim 27, wherein the surface cooler layer comprises a plurality of fins.

29. The engine of claim 27, further comprising disposing the surface cooler layer on the inner wall, the outer wall or both the inner wall and the outer wall of the engine.

30. The engine of claim 27, wherein the plurality of fins comprise a tandem or a multi-element outlet guide vanes.

31. An engine, comprising:
  a core engine; and
  an outlet guide vane assembly, comprising:
    one or more outlet guide vanes, wherein each of the one or more outlet guide vanes comprises a first surface and a second surface, and wherein the one or more outlet guide vanes are disposed between an inner wall and an outer wall of the engine; and
    a surface cooler layer disposed on at least a portion of the first surface, the second surface, or both, of the one or more outlet guide vanes, wherein the one or more outlet guide vanes comprise a metal foam, a carbon foam, or a combination thereof, and wherein the metal foam, the carbon foam, or the combination thereof is configured to augment heat transfer and enhance acoustic absorption.

32. The engine of claim 31, wherein the surface cooler layer disposed on at least a portion of the first surface, the second surface, or both of the one or more outlet guide vanes comprises a plurality of fins.

* * * * *